United States Patent
Zhao et al.

(10) Patent No.: US 9,512,336 B2
(45) Date of Patent: Dec. 6, 2016

(54) AQUEOUS PRIMER COMPOSITION FOR ENHANCED FILM FORMATION AND METHOD OF USING THE SAME

(71) Applicant: Cytec Industries Inc., Woodland Park, NJ (US)

(72) Inventors: Yiqiang Zhao, Newark, DE (US); Dalip K. Kohli, Churchville, MD (US); Gaurang Kunal Shah, Gujart (IN)

(73) Assignee: CYTEC INDUSTRIES INC., Woodland Park, NJ (US)

( * ) Notice: Subject to any disclaimer, the term of this patent is extended or adjusted under 35 U.S.C. 154(b) by 127 days.

(21) Appl. No.: 14/460,476

(22) Filed: Aug. 15, 2014

(65) Prior Publication Data

US 2015/0096680 A1  Apr. 9, 2015

Related U.S. Application Data

(60) Provisional application No. 61/886,817, filed on Oct. 4, 2013.

(51) Int. Cl.

| | |
|---|---|
| *C09J 7/02* | (2006.01) |
| *B32B 37/12* | (2006.01) |
| *B05D 3/04* | (2006.01) |
| *B05D 3/10* | (2006.01) |
| *C09D 5/00* | (2006.01) |
| *B05D 1/02* | (2006.01) |
| *C09J 5/02* | (2006.01) |

(52) U.S. Cl.
CPC ................ *C09J 7/0257* (2013.01); *B05D 1/02* (2013.01); *B05D 3/0406* (2013.01); *B05D 3/102* (2013.01); *B32B 37/12* (2013.01); *B32B 37/1284* (2013.01); *C09D 5/002* (2013.01); *C09J 5/02* (2013.01); *B32B 2037/1253* (2013.01); *B32B 2305/72* (2013.01); *B32B 2305/74* (2013.01); *B32B 2311/24* (2013.01); *B32B 2363/00* (2013.01); *B32B 2369/00* (2013.01); *C09J 2463/003* (2013.01); *Y10T 428/31529* (2015.04)

(58) Field of Classification Search
USPC ......................................... 156/330
See application file for complete search history.

(56) References Cited

U.S. PATENT DOCUMENTS

| | | | |
|---|---|---|---|
| 5,098,594 A | 3/1992 | Doscher | |
| 6,475,621 B1 * | 11/2002 | Kohli | C09D 5/002 428/411.1 |
| 2010/0247922 A1 | 9/2010 | Shah et al. | |

FOREIGN PATENT DOCUMENTS

| | | |
|---|---|---|
| WO | 9914277 A1 | 3/1999 |
| WO | 2007146521 A1 | 12/2007 |
| WO | 2008085713 A1 | 7/2008 |

OTHER PUBLICATIONS

International Search Report. PCT/US2014/052244.28 Nov. 2014.

\* cited by examiner

*Primary Examiner* — Daniel Lee
(74) *Attorney, Agent, or Firm* — Thi D. Dang

(57) ABSTRACT

A water-based bonding primer composition and a method of applying the same onto a metallic surface prior to adhesive bonding. The bonding primer composition is a water-based dispersion containing water, one or more epoxy resins, one or more curing agents, a silane compound, a low amount of propylene carbonate (PC), and optional additives. The bonding primer composition can form substantially smooth films by spraying, and at the same time, meet environmental regulations and provide high bonding performance.

16 Claims, 2 Drawing Sheets

Primer Formulation 1

Primer Formulation 1

Control (no solvent)

AQUEOUS PRIMER COMPOSITION FOR ENHANCED FILM FORMATION AND METHOD OF USING THE SAME

This application claims the benefit of prior U.S. Provisional Application No. 61/886,817, filed on Oct. 4, 2013, which is incorporated herein in its entirety.

In the manufacture of composite structures, particularly in the aerospace and automotive industries, it is conventional to bond a fabricated metallic structure to metallic or composite adherends utilizing structural adhesives or to laminate one or more prepreg plies of resin impregnated fibrous reinforcement to the fabricated metallic structure. Bonding typically requires curing the structural adhesives after the structures are joined. In general, to ensure the greatest level of adhesive strength, the metal surface(s) are scrupulously cleaned of dirt, soil, grease, and metal oxidation products immediately prior to bonding. Unfortunately, this procedure cannot be generally used most times as the cleaning and bonding operations are often separated by long periods of inactive time. During such periods, the metal surface may become hydrolyzed, lessening the adhesive strength of the bond. A solution to overcome this difficulty is to apply a primer on the cleaned metal surface(s).

Conventional primers have often been prepared from thermosetting resins dissolved in volatile organic solvents, e.g. acetone, isopropyl alcohol, tetrahydrofuran (THF), methyl ether ketone, ethylene glycol, xylene, toluene, ethyl acetate, and the like. Such solvent-based primers can form smooth films when sprayed onto metallic surfaces prior to curing. However, the use of primers containing large amounts of volatile organic compounds ("VOCs") is under increasing scrutiny for both toxicological and environmental reasons. Consequently, water-based primers are becoming more desirable. However, commercially available water-based bonding primers that contain epoxy resins tend to form a powdery (powder-like) coating when they are applied via spraying, and the resulting air-dried film has poor scratch or rub resistance before cure. This can be an issue in structural bonding if the primer is scraped-off before curing. Scratch or rub resistance is relating to the ability of the primer film, after being air-dried, to resist scratching or rubbing off (i.e. being removed by rubbing) during the handling of the metallic part with the primer film thereon.

Another significant consideration in the use of primers is the durability and corrosion resistance of the joints formed between the metal surface and the material bonded to the metal surface. This is particularly important in structural applications, such as aircraft structures, because these joints are exposed to a wide range of environmental conditions with extreme temperatures, high humidity, and highly corrosive marine environments. To avoid the failure of the joints as well as to meet stringent commercial passenger and cargo aircraft standards, the adhesive-bonded joints of the structural components must withstand harsh environmental conditions, and, in particular, resistance to corrosion and disbanding in humid, salt-laden environments, especially those resulting from sea spray or de-icing materials. Failure of these joints often starts with diffusion of water through the adhesive followed by corrosion of the underlying metal structure.

There remains a need for a method for bonding metallic structures using primer formulations that can form substantially smooth films by spraying, and at the same time, meet environmental regulations, provide high bonding performance and corrosion protection.

SUMMARY

Disclosed herein is a method of applying a one part, water-based bonding primer composition onto a metallic surface of a first substrate prior to bonding the metallic surface to a second substrate via a curable adhesive. The bonding primer composition is a water-based dispersion containing water, one or more epoxy resins, one or more curing agents, a silane compound, a low amount of propylene carbonate (PC), and optional additives.

DETAILED DESCRIPTION

Figure 1A:
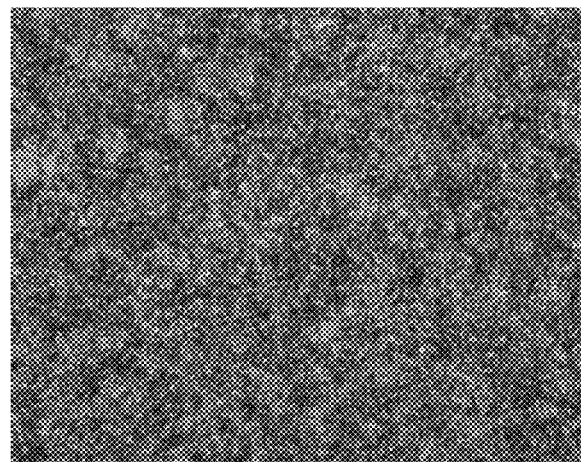
FIG. 1A is a photographic image showing the surface of a primer film formed from a propylene carbonate—containing formulation according to one embodiment.

The bonding primer composition of the present disclosure provides corrosion protection and enhanced bonding ability of metallic materials, particularly, aluminum and aluminum alloys used in the aerospace industry. It has been found that the presence of propylene carbonate enhances film formation of the primer composition by enabling the formation of a smooth primer film that is scratch-resistant and rub-resistant before cure and solvent-wipe resistant after cure. In addition, propylene carbonate can function as a buffering agent by reacting with certain water-soluble curing agents/catalysts in the primer compositions to stabilize as well as provide a neutral pH (around 7±0.5). Some water-soluble curing agents and catalysts, such as imidazole, tend to dissolve in the water-based primer composition to form a solution with a highly basic pH, thereby negatively affect the adhesion of the primer film to metal surface. As such, propylene carbonate is a multifunctional component in the primer composition.

One aspect of the present disclosure is directed to a method of applying the water-based bonding primer composition onto a metallic surface of a first substrate prior to bonding the metallic surface to a second substrate. The bonding primer composition is a water-based (or aqueous) dispersion having a solid content from 10% to 25%, and containing: water, one or more thermosettable resins, curing agent(s)/catalyst(s), a silane compound, and a low amount of propylene carbonate (PC). The amount of PC, in weight percentage, is less than 15 wt. % (weight percent) based on the total weight of the composition, preferably, within the range of 1 wt. % to 10 wt. %. In some embodiments, the amount of PC may be about 10-15 g/L of water-based primer composition. The bonding primer composition could be applied onto a metallic surface by spraying to form a smooth, continuous primer film. The term "smooth" in this context refers to a film having an even surface that is substantially free of perceptible projections, lumps, or indentations, and is not powder-like in appearance. Furthermore, the sprayed primer film is capable of being air-dried at ambient temperature (21° C.-26° C.) in 30 minutes or less, e.g. 15-30 minutes. Due to the low load level of PC, the primer composition is readily in compliance with the current OSHA (Occupational Safety and Health Administration) and REACH (Registration, Evaluation, Authorization and Restriction of Chemicals) requirements. Currently, propylene carbonate is considered a non-VOC chemical compound in the United States.

For adhesive bonding of a metallic substrate to another substrate (metal or composite substrate), the water-based primer composition of the present disclosure may be applied onto a metallic surface by spraying or brushing to form a curable primer film. After being air dried at ambient temperature for less than 30 minutes, the curable primer film is resistant to scratching and rubbing off. The metallic surface is preferably pre-treated prior to applying the primer composition in order to enhance the adhesion of the metallic surface to the subsequently applied primer film and to provide corrosion resistance to the metal surface. The primer film is cured in an oven at an elevated temperature (e.g. 250T or 350T for one hour) prior to bonding assembly. The primed surface of the metallic substrate is then adhered to the second substrate by providing a curable, polymeric adhesive film between the primed surface and the second substrate. The second substrate may be another metallic substrate or a composite substrate composed of reinforcement fibers embedded in or impregnated with a matrix resin. The adhesive may be applied onto a surface of the second substrate, or alternatively, the adhesive may be applied onto the primed surface of the first substrate. The resulting assembly is then subjected to curing at an elevated temperature to cure the adhesive, and consequently, to produce a bonded structure. Curing may be carried out by applying heat and pressure to the assembly. The primer composition is formulated so that it can be compatible with conventional curable, polymeric adhesives (particularly, epoxy-based adhesives) that are curable at temperatures within the range of 250° F. to 350° F. (121° C. to 177° C.).

The term "substrate" as used herein includes layers and structures of any shape and configuration.

The terms "cure" and "curing" as used herein refer to the hardening of a polymer material by cross-linking of polymer chains, brought about by chemical additives, ultraviolet radiation or heat. Materials that are "curable" are those capable of being cured, i.e. becoming harden.

When the second substrate is a composite substrate composed of reinforcement fibers and matrix resin, the matrix resin may be partially or fully cured, or uncured. When the matrix resin is uncured or only partially cured prior to the adhesive joining of the two substrates, full curing of the matrix resin occurs simultaneously with the curing of the adhesive during the bonding stage.

The primer composition may be applied (e.g. by spraying) to the metallic surface in several layers until a desired film thickness is achieved. For example, the amount of primer composition is applied so that the cured primer film may have a thickness from about 0.0001 inch to about 0.0003 inch (or 0.1 mil to 0.3 mil).

The water-based primer composition disclosed herein preferably includes inorganic or organic corrosion inhibitors to further improve long-term, anti-corrosion performance.

To enhance the adhesion of the metallic surface to the subsequently applied polymeric primer film, the metallic surface may be pre-treated prior to applying the primer compositions thereon. Suitable surface treatments include wet etching, anodization such as phosphoric acid anodization (PAA), and phosphoric acid/sulfuric acid anodization (PSA), and sol-gel processes that are known to those skilled in the art. A more specific example of a suitable surface treatment is ASTM D2651, which includes cleaning with a soap solution, followed by wet etching and then anodizing with an acid. The water-based primer composition disclosed herein is formulated to be compatible with these various surface treatments.

PAA typically involves using phosphoric acid (e.g. ASTM D3933) to form metal oxide surfaces, and PSA typically involves using phosphoric-sulphuric acid to form metal oxide surfaces. Anodizing produces a porous, rough surface into which the primer composition can penetrate. Adhesion results primarily from mechanical interlocking between the rough surface and the primer film.

Sol-gel process typically involves the growth of metal-oxo polymers through hydrolysis and condensation reactions of an aqueous solution of organo-functional silane and zirconium alkoxide precursors to form inorganic polymer networks on the metal surface. The sol-gel coating can provide good adhesion between the metal surface and the subsequently-applied primer film via covalent chemical bonding.

Thermosettable Resins

The preferred thermosettable resins are epoxy resins. Suitable epoxy resins include multifunctional epoxy resins having functionality of at least about 1.8, or at least about 2 functionalities. The epoxy resins are optionally chain-extended, solid glycidyl ethers of phenols, such as resorcinol and the bisphenols, e.g., bisphenol A, bisphenol F, and the like. Also suitable are the solid glycidyl derivatives of aromatic amines and aminophenols, such as N,N,N',N'-tetraglycidyl-4,4'diaminodiphenylmethane. Moreover, the epoxy resins may have an epoxy equivalent weight (EEW) of about 145-5000, with an equivalent weight of about 300-750 being preferred, and an equivalent weight of 325 being most preferred.

The epoxy resins may be in solid form, or a dispersion of solid epoxy. The epoxy resin in dispersed phase may be a dispersion of more than one epoxy resin in the form of a mixture of distinct particles, or may consist of only one type of particles containing more than one epoxy resin per particle. Thus, a flexibilizing epoxy such as the higher molecular weight bisphenol A or bisphenol F epoxies may be blended with a high-temperature resistant epoxy such as tetraglycidyl methylene dianiline (TGMDA), then the mixture is cooled, ground, or otherwise dispersed into solid particles of the requisite size. These same epoxy resins might be advantageously dispersed separately without blending.

A mixture of different epoxy resins may be used. In one embodiment, the mixture of epoxy resins includes novolac epoxy resin and diglycidyl ether of bisphenol A ("DGEBA") resin. Examples include novolac epoxy resins such as Epirez 5003 available from Huntsman, and bisphenol A epoxy resins such as XU-3903 available from Huntsman and D.E.R. 669 available from Dow Chemical Co. In another embodiment, the resin mixture contains an epoxy resin having a functionality of about 4 or less, and an epoxy resin having a functionality of about 5 or more. The use of higher functionality epoxy resins, i.e., epoxy resins having a functionality of five or more, in minor amounts is suitable, for examples less than 40 wt. % based on the sum of the weights of all epoxy resins in the composition. The use of such higher functionality epoxy resins in such minor amounts has been found to increase the solvent resistance of the cured primer composition without substantially lowering the adhesive properties.

In one embodiment, the primer composition includes a mixture of the following epoxy resins:

1) from 30 to 70 wt. % of an epoxy resin having a functionality of from about 1.8 to about 4 and an epoxy equivalent weight of from about 400 to about 800;

2) from 5 to 20 wt. % of an epoxy resin having a functionality of from about 1.8 to about 4 and an epoxy equivalent weight of from about 2000 to about 8000; and 3) from 10 to 40 wt. % of an epoxy resin having a functionality of about 5 or more and having an epoxy equivalent weight of from about 100 to about 400, wherein the weight percentages totaling 100% based on total weight of the epoxy mixture.

The total amount of epoxy resin(s) may be about 20-60% by weight based on total weight of the primer composition.

Curing Agents and Catalysts

The water-based primer composition contains one or more curing agents and/or catalysts which may be water-soluble or water-insoluble. Suitable curing agents include a water-soluble, substituted amino triazine such as 2-β-(2'-methylimidazolyl-1'1-ethyl-4,5-diamino-s-triazine (which is commercially available as CUREZOL 2 MZ-Azine®); a modified polyamine, e.g. Ancamine 2014®; dicyandiamide (DICY), or a water-insoluble curing agent such as a bisurea based curing agent (such as Omicure 24 from CVC Chemicals) or Toluene-2,4-bis(N,N' dimethyl urea) (such as Omicure U-24 from CVC Chemicals); amine-epoxy adducts and/or an aromatic amine such as bis(3-aminopropyl)-piperazine (BAPP) (available from BASF).

Catalysts may be added as an optional component to speed up the curing/crosslinking of the thermoset resins or to enable curing at lower temperatures. Solid, water-dispersible catalysts may be added when a particular curing agent is not sufficiently active at the primer composition's heating temperature to effect cure of the primer composition. For example, where a curing agent is active at 350° F., a catalyst is added to enable curing at around 250° F. The catalyst may be water soluble or water insoluble, and may be in particulate form having a particle size such that essentially 100 percent of the particles have a mean diameter of less than about 30 μm. The mean diameter of the particles can be measured by laser light diffraction method using instruments such as Malvern Mastersizer 2000 and Horiba LA-910. Typical catalysts that may be employed include, but are not limited to: bisureas, blocked imidazoles, substituted imidazoles or other blocked amines such as amine/epoxy adducts, hydrazines, etc.

The curing agent(s), solely or in combination with one or more catalyst(s), may be present in amounts from about 2 to 30 parts per 100 parts of the epoxy resin in total (i.e. total amount of epoxy or epoxies).

Silane Compounds

The silane compound in the water-based primer composition has silane functional groups that can react or bond to the material to be bonded to a metallic surface. Suitable silane compounds include organosilanes. Organosilanes having hydrolyzable groups are preferred. In certain embodiments, the organsilanes have the following general formula:

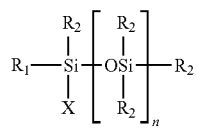

wherein n is greater than or equal to 0; wherein each X is OH, $OCH_3$, and $OCH_2H_5$; wherein $R_1$ is $CH=CH_2$,

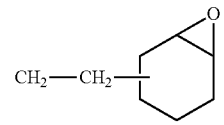

or $CH_2-CH_2-CH_2-Y$, wherein Y is $NH_2$, SH, OH, NCO, $NH-CO-NH_2$, $NH-(CH_2)_3NH_2$, NH-Aryl,

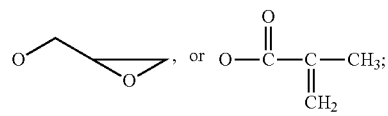

and wherein each $R_2$ is alkyl, alkoxy, aryl, substituted aryl, or $R_1$.

Examples of suitable, commercially available organosilane compounds are those available from OSi Specialties Inc., Danbury, Conn. including, but are not limited to, A-186, a beta-(3,4-epoxycyclo hexyl)ethyltrimethoxy silane; A-187, a gamma-glycidoxypropyltrimethoxysilane; A-189, a gamma-mercaptopropyltrimethoxysilane; A-1100, a gamma-aminopropyltriethoxysilane; A-1106, an aminoalkyl silicone solution; A-1170, a bis-(gamma-trimethoxysilylpropyl)amine; Y-9669, a N-phenyl-gamma-aminopropyl-trimethoxysilane; Y-11777, an amino alkyl silicone/water solution; and Y-11870, an epoxy functional silane solution. Other suitable commercially available organosilanes include, but are not limited to, Z-6040, a gamma-glycidoxypropyl-trimethoxy silane from Dow Corning, Midland, Mich., HS2759, an aqueous epoxy functional silane; HS2775, an aqueous amino silane solution; and HS2781 an aqueous oligomeric silane solution with amino and vinyl groups all sold by Huls America Inc., N.J. Another example is 3-glycidoxypropylmethoxysilane, which is sold under the trademark Z-6040.

Generally, the organosilane is present in the water-based primer composition in amounts ranging from about 0.01 to 15 parts per 100 parts of water, preferably from about from about 0.1 to 10 parts per 100 parts of water.

The organosilane may be in a liquid or powder form that can be added directly to the water-based primer composition.

Corrosion Inhibitors

Chromates or non-chromate corrosion inhibitors may be used in the water-based primer composition disclosed herein, however, to comply with environmental, health and safety regulations, non-chromate compounds are preferred. Examples of suitable chromate corrosion inhibitors include strontium chromate, barium chromate, zinc chromate, and calcium chromate. Non-chromate corrosion inhibitors include inorganic compounds containing one or more ions selected from the group consisting of $NaVO_3$, $VO_4$, $V_2O_7$, phosphate, phosphonate, molybdate, cerium, and borate. Examples of inorganic, non-chromate corrosion inhibitors include, but are not limited to, a metavanadate anion, such as sodium metavanadate, a combination of a molybdate and metavanadate, or any combinations of molybdate, metavanadate, phosphate, phosphonate, cerium and borate. Also suitable are organic corrosion inhibitors, including those that are chemically anchored to the surface of a particle or encapsulated and are releasable in the event of corrosion. Examples of such releasable organic corrosion inhibitors are described in U.S. Patent Application Publication 2010/0247922, published on Sep. 30, 2010. A combination of different corrosion inhibitors may be used.

The total amount of corrosion inhibitor may be within the range of 1-7 wt. % based on the total weight of the primer composition.

Optional Additives

The water-based primer composition may optionally contain conventional dyes, pigments, and inorganic fillers. The total amount of such optional additives is less than 3 wt. %, for example, 0.1 wt. % to 2 wt. %. A benefit of compositions containing dyes or pigments is that the surface coverage can be assessed more easily by visual methods. Inorganic fillers, in particulate form, are added in order to control the rheology for application process and stability. Suitable inorganic fillers include fumed silica, clay particles, and the like.

According to one embodiment, the water-based primer composition is a spray-able dispersion having a pH of 6-8 and containing:

(i) 20-60 wt. % one or more epoxy resin(s);
(ii) 2-30 parts curing agent(s), solely or in combination with catalyst(s), per 100 parts of epoxy resin(s) in total;
(iii) organosilane in an amount of 0.1 to 10 parts per 100 parts of water;
(iv) 1-10 wt. % propylene carbonate;
(v) 1-7 wt. % at least one chromate or non-chromate corrosion inhibitor;
(vi) optionally, 0.1-2 wt. % inorganic fillers in particulate form and/or pigment/dyes;
(vii) water to provide 10%-25% solids, where "wt %" represents weight percentage based on the total weight of the composition.

EXAMPLES

The following examples show the performance results obtained using a water-based bonding primer formulation with a low amount of propylene carbonate as compared to other primer formulations which do not contain propylene carbonate.

Example 1

Primer formulations were prepared according to the formulation disclosed in Table 1.

TABLE 1

| Components | Formulation 1 Amount | Formulation 2 Amount |
|---|---|---|
| Bisphenol A epoxy (dispersion with 55% solids) | 83 gms | 83 gms |
| Solid epoxy novolac resin | 11 gms | 11 gms |
| Solid Bisphenol A-based epoxy (powder) | 14 gm | 14 gm |
| 2,2-Bis-4-(4-aminophenoxy) phenyl propane (BAPP) | 10 gms | 10 gms |
| Toluene-2,4-bis (N,N'-dimethyl urea) | 3 gms | 3 gms |
| Paliotol Yellow (pigment) | 0.3 gms | 0.3 gms |
| Strontium chromate (corrosion inhibitor) | 15 gms | 15 gms |
| Fumed silica | 2 gms | 2 gms |
| Organosilane (gamma-glycidoxypropyltrimethoxy silane) | 1 wt % of total water amount | 1 wt % of total water amount |
| Mergal K10N (biocide) | 0.1 wt % of composition | 0.1 wt % of composition |
| Propylene carbonate | | 25 gms |

TABLE 1-continued

| Components | Formulation 1 Amount | Formulation 2 Amount |
|---|---|---|
| Propylene glycol | | 25 gms |
| Deionized (DI) water | To provide 20 wt % solids | To provide 20 wt % solids |

The pH of the primer formulations in Table 1 was approximately 6.5.

Each of the primer formulations was sprayed onto surface treated Al-2024 alloy using HVLP (high velocity low pressure) gun to form a film having 0.2 mil thickness. The surface treatment was according to ASTM D 2651, which includes cleaning, FPL etching and PAA anodization. The resulting uncured films were left to dry by air at ambient temperature. For comparison, a Control primer film was formed by the same method using a formulation without solvent—Formulation 1 without PC.

Evaluation of the primer films was carried out and the results are shown in Table 2.

TABLE 2

| | Control (No solvent) | Formulation 1 | Formulation 2 |
|---|---|---|---|
| Dry film appearance | Powdery | Smooth and adherent | Smooth and adherent |
| Film drying time | Pass | Pass | Not pass |
| Scratch resistance before cure | Not pass | Pass | Pass |

For the film drying time, "pass" means the film was dried by air at ambient temperature in less than 30 minutes after spraying, and "not pass" means it took too long to dry after spraying, or more than 30 minutes.

Scratch resistance test involved rubbing the air-dried, uncured film with fingers or using a dry, white cloth to rub the film surface to see if any film material became attached to the cloth after rubbing several times.

Figure 1B:
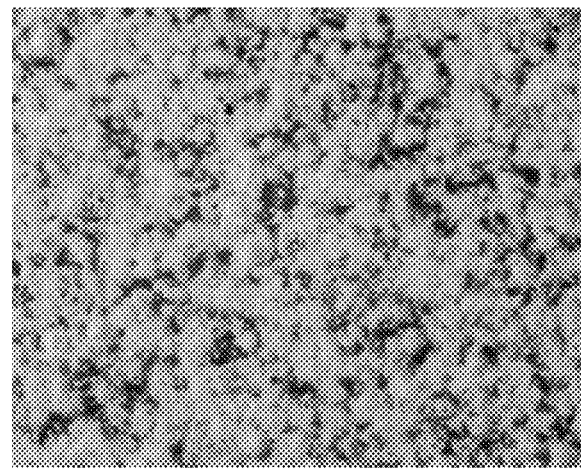
FIG. 1B is a photographic image showing the surface of a primer film formed from a control formulation without solvent.

The surface of the air-dried, uncured primer film formed from Formulation 1 was found to be smooth and scratch resistant, and is shown in FIG. 1A (a photographic image of the primer surface). In contrast, the air-dried, uncured Control film had a powdery appearance as shown in FIG. 1B, and did not pass the scratch resistance test. The uncured primer film formed from Formulation 2 took too long to dry at ambient temperature after spraying, more than 30 minutes, and did not pass the scratch resistance test.

Example 2

Primer formulations were prepared according to the formulation disclosed in Tables 3, 4, and 5.

TABLE 3

| Components | Formulation 3 Amount | Formulation 4 Amount |
|---|---|---|
| Bisphenol A epoxy (dispersion in water with 55% solids) | 133 gms | 133 gms |
| Epoxy novolac resin (dispersion with 54% solids) | 72 gms | 72 gms |
| Solid Bisphenol A-based epoxy (powder) | 9 gms | 9 gms |
| Formulated amine based curing agent | 11 gms | 11 gms |
| 2-β-(2'-methylimidazolyl-1'1-ethyl- | 4 gms | 4 gms |

TABLE 3-continued

| Components | Formulation 3 Amount | Formulation 4 Amount |
|---|---|---|
| 4,5-diamino-s-triazine | | |
| Fumed silica | 0.3 gms | 0.3 gms |
| Dicyandiamide (DICY) | 3 gms | 3 gms |
| Paliotol Yellow (pigment) | 1.8 gms | 1.8 gms |
| Zinc phosphate-based corrosion inhibitor | 24 gms | 24 gms |
| Organosilane (gamma-glycidoxy propyltrimethoxy silane) | 1 wt % of total water amount | 1 wt % of total water amount |
| Mergal K10N (biocide) | 0.1 wt % of composition | 0.1 wt % of composition |
| Propylene carbonate | 20 gms | |
| Propylene glycol | | 20 gms |
| DI water | To provide 20 wt % solids | To provide 20 wt % solids |

TABLE 4

| Components | Formulation 5 Amount | Formulation 6 Amount |
|---|---|---|
| Bisphenol A epoxy (dispersion in water with 55% solids) | 133 gms | 133 gms |
| Epoxy novolac resin (dispersion in water with 54% solids) | 72 gms | 72 gms |
| Solid Bisphenol A-based epoxy (powder) | 9 gms | 9 gms |
| Formulated amine-based curing agent | 11 gms | 11 gms |
| 2-β-(2'-methylimidazolyl-1'1-ethyl-4,5-diamino-s-triazine | 4 gms | 4 gms |
| Fumed silica | 0.3 gms | 0.3 gms |
| Dicyandiamide (DICY) | 3 gms | 3 gms |
| Paliotol Yellow (pigment) | 1.8 gms | 1.8 gms |
| Zinc phosphate-based corrosion inhibitor | 24 gms | 24 gms |
| Organosilane (gamma-glycidoxy propyltrimethoxy silane) | 1 wt % of total water amount | 1 wt % of total water amount |
| Mergal K10N (biocide) | 0.1 wt % of composition | 0.1 wt % of composition |
| Acetone | 28 gms | |
| 2-Propoxyethanol | | 28 gms |
| DI water | To provide 20 wt % solids | To provide 20 wt % solids |

TABLE 5

| Components | Formulation 7 Amount | Formulation 8 Amount |
|---|---|---|
| Bisphenol A epoxy (dispersion in water with 55% solids) | 133 gms | 133 gms |
| Epoxy novolac resin (dispersion in water with 54% solids) | 72 gms | 72 gms |
| Solid Bisphenol A-based epoxy (powder) | 9 gms | 9 gms |
| Formulated amine-based curing agent | 11 gms | 11 gms |
| 2-β-(2'-methylimidazolyl-1'1-ethyl-4,5-diamino-s-triazine | 4 gms | 4 gms |
| Fumed silica | 0.3 gms | 0.3 gms |
| DICY | 3 gms | 3 gms |
| Paliotol Yellow (pigment) | 1.8 gms | 1.8 gms |
| Zinc phosphate-based corrosion Inhibitor | 24 gms | 24 gms |
| Organosilane (gamma-glycidoxy propyltrimethoxy silane) | 1 wt % of total water amount | 1 wt % of total water amount |
| Mergal K10N (biocide) | 0.1 wt % of composition | 0.1 wt % of composition |
| Acetone | 14 gms | 7 gms |
| 2-Propoxyethanol | 14 gms | 17 gms |
| 2-Propanol | | 17 gms |
| DI water | To provide 20 wt % solids | To provide 20 wt % solids |

Each of the primer formulations was sprayed onto surface treated Al-2024 alloy using HVLP gun to form a film having 0.2 mil thickness as discussed in Example 1. For comparison, a Control primer film was formed by spraying a primer formulation without any solvent—Formulation 3 without propylene carbonate.

The air-dried, uncured primer films were evaluated and the results are shown in Table 6. The pH of the primer formulations are also shown in Table 6. Additionally, Single Lap Shear test (ASTM D1002) and Floating Roller Peel (ASTM D3167) test were carried out to determine the bonding performance of the primer films. These tests were done after bonding the primed surface to another aluminum alloy (Al 2024T3) sheet using a curable, epoxy-based adhesive (FM 73M from Cytec Industries Inc.), followed by curing. Table 6 shows the results of the mechanical tests.

TABLE 6

| | Dry film appearance | Film drying time | Scratch resistance before cure | pH | Solvent wiping resistance after cure | Failure mode of mechanical test |
|---|---|---|---|---|---|---|
| Control (No solvent) | Powdery | Pass | Not pass | 9.2 | Not pass | Sometimes Primer failure observed |
| Formulation 3 | Smooth and adherent | Pass | Pass | 7.0 | Pass | Cohesive failure |
| Formulation 4 | Smooth and adherent | Not pass | Pass | 9.0 | Pass | — |
| Formulation 5 | Smooth and adherent | Pass | Pass | 9.0 | Not pass | Primer failure |
| Formulation 6 | Smooth and adherent | Pass | Pass | 9.0 | Not pass | Primer failure |
| Formulation 7 | Smooth and adherent | Pass | Pass | 9.0 | Not pass | Primer failure |
| Formulation 8 | Smooth and adherent | Pass | Pass | 9.0 | Not pass | Primer failure |

Figure 2:
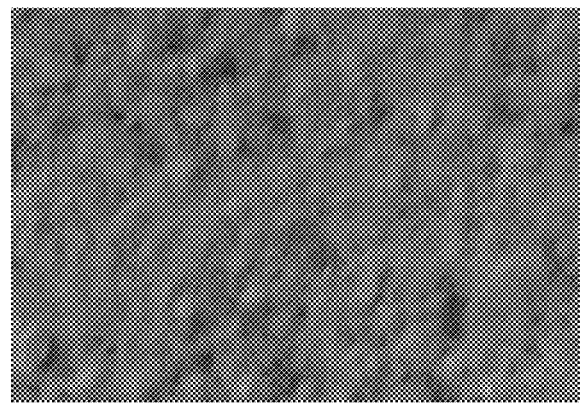
FIG. 2 is a photographic image showing the surface of a primer film formed from a propylene carbonate—containing formulation according to another embodiment.

The air-dried, uncured primer film formed from Formulation 3 was homogeneous and smooth, and exhibited good scratch resistance. FIG. 2 shows the surface of the primer film formed from Formulation 3. In contrast, the uncured Control film was powdery in appearance and had poor scratch resistance. Moreover, the pH value of the Control formulation (without propylene carbonate) was about 9.2 due to the presence of the water-soluble catalyst 2-β-(2'-methylimidazolyl-1'1-ethyl-4,5-diamino-s-triazine. With the addition of propylene carbonate, the pH of Formulation 3 was effectively lowered to around 7, exactly at the desired neutral level. Here, propylene carbonate acts not only as a film promoter but also as a buffer agent to bring the pH of the primer composition from basic to around 7 by reacting with the water-soluble catalyst.

Although Formulations 4-8 were capable of forming smooth films by spraying, these films failed to provide the bonding performance desired due in part to the high pH. Moreover, Formulation 4 took too long to dry. It has been found that the neutral pH of the water-based primer can optimize surface adhesion via the silane coupling agent and is normally required for overall balanced performance of the water-based primer.

What is claimed is:

1. A surface treatment method for treating a metallic surface prior to adhesive bonding comprising:
    applying a water-based primer composition onto a metallic surface to form a curable primer film having a smooth, continuous surface, said water-based primer composition comprising:
    one or more epoxy resins;
    at least one curing agent;
    a silane compound having at least one hydrolyzable group;
    propylene carbonate; and
    water,
    wherein the water-based primer composition has a solid content of 10%-25%, and the amount of propylene carbonate is less than 15% by weight based on the total weight of the primer composition.

2. The surface treatment method of claim 1, wherein the water-based primer composition is applied by spraying.

3. The surface treatment method of claim 1, wherein the pH of the primer composition is within the range of 6-8.

4. The surface treatment method according to claim 1, wherein the curing agent is water-soluble, and without propylene carbonate, the pH of the primer composition would be higher.

5. The surface treatment method according to claim 1, wherein the primer film is air-dried in 30 minutes or less at ambient temperature (21° C.-26° C.).

6. The surface treatment method according to claim 1, wherein the water-based primer composition further comprising a corrosion-inhibiting compound.

7. The surface treatment method according to claim 1, wherein the metallic surface is the surface of an aluminum or aluminum alloy substrate.

8. The surface treatment method according to claim 1, wherein the metallic surface is subjected to anodization or sol-gel process to form a metal oxide coating prior to applying the water-based primer composition.

9. A bonding method comprising:
    (a) applying a water-based primer composition onto a surface of a metallic substrate to form a curable primer film having a smooth, continuous surface, said water-based primer composition comprising:
    one or more epoxy resins;
    at least one curing agent;
    a silane compound having at least one hydrolyzable group;
    propylene carbonate; and
    water,
    wherein the water-based primer composition has a solid content of 10%-25%, and the amount of propylene carbonate is less than 15% by weight based on the total weight of the primer composition;
    (b) adhesively joining the metallic substrate to a second substrate whereby a curable, polymeric adhesive is positioned between the primer film and the second substrate; and
    (c) curing the adhesive to form a bonded structure.

10. The bonding method of claim 9, wherein the water-based primer composition is applied at step (a) by spraying.

11. The bonding method of claim 9, wherein the water-based primer composition further comprising a corrosion-inhibiting compound.

12. The bonding method according to claim 9, wherein the second substrate is another metallic substrate.

13. The bonding method according to claim 9, wherein the second substrate is formed of aluminum or aluminum alloy.

14. The bonding method according to claim 9, wherein the second substrate is a composite substrate comprising a resin matrix and reinforcement fibers.

15. The bonding method of claim 14, wherein the composite substrate is uncured when it is being joined to the metallic substrate at step (b).

16. The bonding method of claim 14, wherein the composite substrate is partially or fully cured when it is being joined to the metallic substrate at step (b).

* * * * *